United States Patent [19]
Nicholson

[11] 3,886,248
[45] May 27, 1975

[54] METHOD OF MAKING PLASTIC EMBEDDED SPECIMENS

[76] Inventor: Donald C. Nicholson, 124-18th St. W. Bldg., Rock Island, Ill. 61201

[22] Filed: June 3, 1971

[21] Appl. No.: 149,611

Related U.S. Application Data

[62] Division of Ser. No. 850,476, Aug. 15, 1969, Pat. No. 3,596,317.

[52] U.S. Cl. ................. 264/102; 264/246; 264/271
[51] Int. Cl. .............................................. B29d 3/00
[58] Field of Search ........... 264/275, 277, 271, 102, 264/125, 126

[56] References Cited
UNITED STATES PATENTS

| | | | |
|---|---|---|---|
| 2,350,421 | 6/1944 | Schoder et al.................. | 264/275 X |
| 2,494,834 | 1/1950 | Ringheim....................... | 264/271 X |
| 3,558,766 | 1/1971 | Halpert.............................. | 264/275 |

FOREIGN PATENTS OR APPLICATIONS

| | | | |
|---|---|---|---|
| 38-7475 | 5/1963 | Japan................................. | 264/271 |

OTHER PUBLICATIONS

DuPont Information Bulletin No. X-28C, "Lucite" Acrylic Resin Embedment of Specimens, 8/1955.

Hibben, Scientific Apparatus & Laboratory Methods, Preservation of Specimens, 86 Science 247–248 (1937).

Primary Examiner—Robert F. White
Assistant Examiner—T. E. Balhoff
Attorney, Agent, or Firm—Lockwood, Dewey, Zickert & Alex

[57] ABSTRACT

A method of embedding entomological specimens or the like in a clear transparent plastic material, wherein the method comprises positioning the specimen between layers of thermoplastic resin material in granular or powder form and confining the same in a suitable die cavity, with provision for preheating the die cavity, applying heat sufficient to melt the resin without appreciable pressure, placing the melted material under predetermined pressure and heating to a temperature sufficient for polymerization, vacuumizing to remove excess gases, cooling the liquified material to set the same and removing the resultant solid plate from the cavity.

7 Claims, 5 Drawing Figures

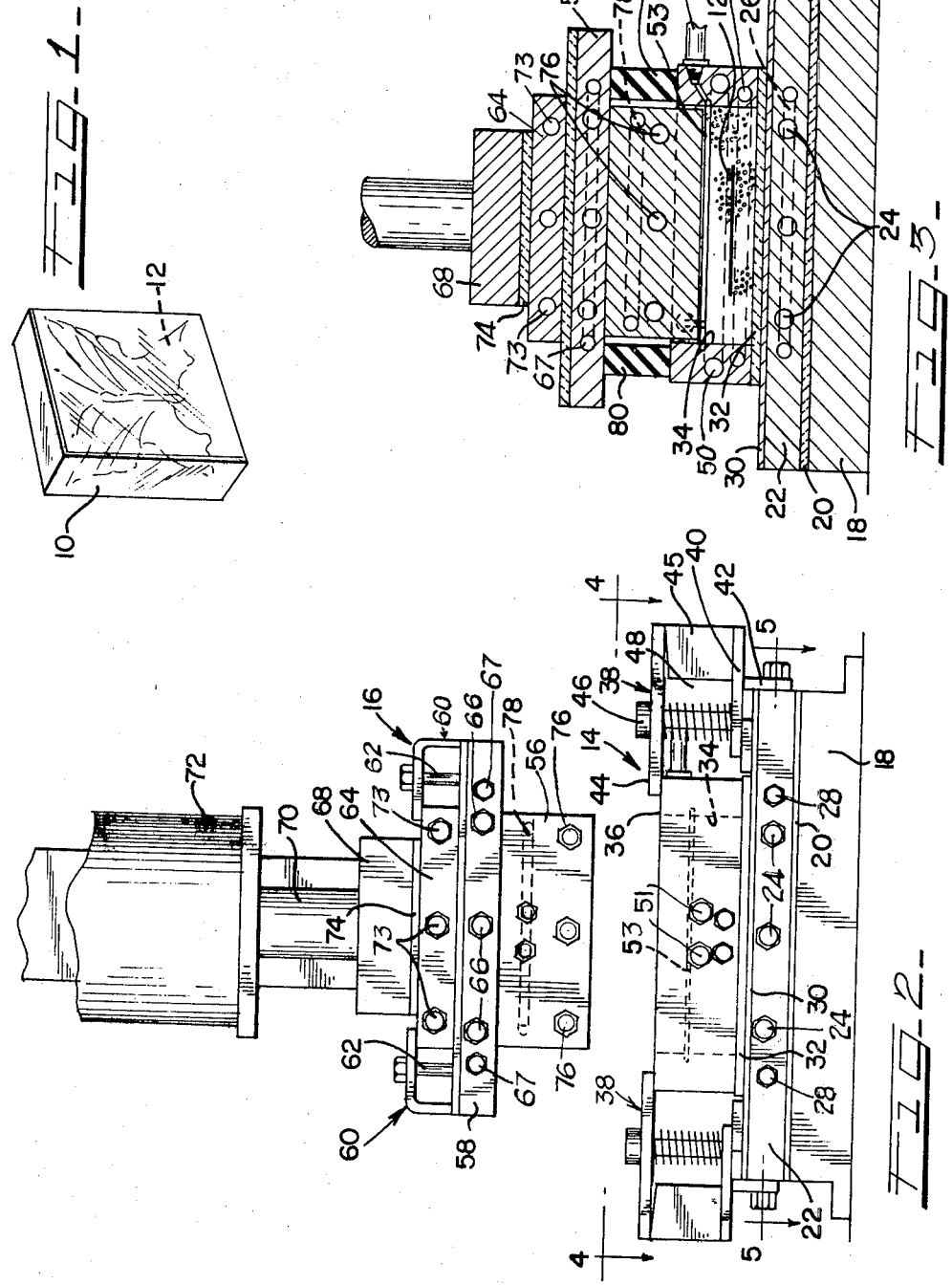

INVENTOR
DONALD C. NICHOLSON
BY Greist Lockwood Greenawalt & Dewey
ATT'YS.

METHOD OF MAKING PLASTIC EMBEDDED SPECIMENS

This application is a division of my application Ser. No. 850,476, filed Aug. 15, 1969, now U.S. Pat. No. 3,596,317.

This invention relates to fabrication of plates of transparent plastic material having embedded therein entomological specimens or the like and is more particularly concerned with a novel method of arranging the specimens between layers of meltable plastic material and thereafter controlling the temperature and applying sufficient pressure so as to enable the plastic to be polymerized and set.

Numerous procedures have been suggested for embedding specimens of various kinds in plastic materials so as to preserve the same or for decorative or other purposes. Many of these procedures have involved coating or otherwise immersing the specimens in a plastic material which is in a liquid state and thereafter treating the plastic to harden the same. In some procedures a mold has been employed to confine the material and determine the final shape of the product. However, none of the procedures and apparatus heretofore provided have been found fully satisfactory for embedding in plates or blocks of plastic material articles which are relatively fragile and easily damaged by handling and which may be destroyed when placed in a high pressure and high temperature environment. It is an object, therefore, of the present invention to provide an improved method of embedding in plates or blocks of thermoplastic resin articles, such as, entomological or lepidoptera specimens, so as to preserve the specimens in an undamaged condition.

A more specific object of the invention is to provide a method of embedding entomological specimens, or the like, in a clear plastic material which comprises positioning the specimens between layers of a meltable plastic material in granular form while confining the same in a cavity in a female molding member, closing the cavity without appreciable pressure on the plastic and specimen assembly, heating the cavity to a sufficient degree to melt the plastic, applying sufficient heat and pressure to the melted plastic to polymerize the plastic, vacuumizing the cavity, and cooling the same so as to set the plastic and form a transparent plate with the specimen embedded therein.

Another object of the invention is to provide a method of embedding entomological specimens, or the like, in plastic material wherein layers of plastic material in granular form are arranged in a cavity in a female molding member with a desired specimen interposed between the layers of material which support the specimen in the desired position and a co-operating male molding member or punch, which is mounted for reciprocating movement on the end of a fluid actuated plunger, is positioned so that the punch will telescope within the cavity, the molding members having means for heating and cooling the same, and wherein the cavity is first heated to a temperature sufficient to melt the plastic and thereafter to polymerize the plastic and finally the product is cooled while the same is under a predetermined pressure applied through movement of the male molding member into the cavity of the female member.

A further object of the invention is to provide a method of molding which is especially designed for embedding specimens of a relatively fragile nature in a thermoplastic resin wherein a bottom female molding frame is seated on a highly polished surface, which frame has a cavity of a size and shape desired for the finished product with heating and cooling means operable to control the temperature in the cavity, and a co-operating top male molding member which is in the form of a punch mounted for reciprocating movement on a fluid operated piston is positioned so as to be telescoped into the cavity in the bottom molding frame, the male molding member also having temperature controlling heating and cooling means, and wherein a vacuum line is connected to the bottom molding frame and operated for withdrawing air and gases from an assembly of granular resin and a specimen or specimens buried between layers of the resin which is disposed in the cavity while the resin is liquified, polymerized, and set, by controlling the temperature in the cavity and the pressure exerted by the male molding member to form a plate with the specimen or specimens embedded therein.

These and other objects and advantages of the invention will be apparent from a consideration of the method and apparatus which is shown by way of illustration in the accompanying drawings wherein:

FIG. 1 is a perspective view of a plastic plate having an entomological specimen embedded therein which has been produced by employing the method and apparatus of the invention;

FIG. 2 is a side elevation of an apparatus suitable for carrying out the method of the invention, the apparatus being shown with the top and bottom molding members in separated position;

FIG. 3 is a vertical section taken on a plane at right angles to the plane of FIG. 2 with the molding members in cavity closing, operative position, the view being taken on the line 3—3 of FIG. 4;

Referring first to FIG. 1 of the drawings, there is illustrated a molded plastic plate 10 in which there has been embedded an entomological specimen 12 which in the illustration is a butterfly. The plate 10 is of generally rectangular form and is transparent so that the specimen is clearly visible and all exposed areas may be observed through the plastic material. A suitable molding material is a synthetic resin which is meltable and in the finished product is optically transparent. It may be, for example, an acrylic resin, such as, a polymethylmethacrylate, or other transparent synthetic plastic. Commercial products sold under the names Lucite, Plexiglass and Perspex are suitable and are readily available in crystaline or powder form.

An apparatus suitable for practicing the invention is illustrated in FIGS. 2 to 5. The apparatus comprises a bottom mold assembly 14 and a top mold assembly 16 which co-operates with the bottom assembly 14 in forming a molding cavity in which the resin and the desired specimen or specimens are enclosed during the processing required for polymerizing and setting the resin to form the finished plate.

Figure 4:
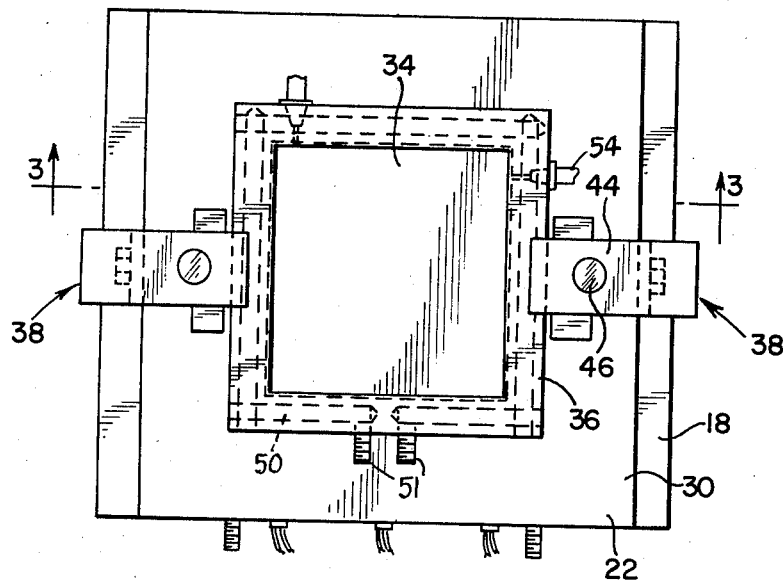
FIG. 4 is a plan view, taken on the line 4—4 of FIG. 2, showing the bottom molding member in position for receiving the plastic and the specimen or specimens to be embedded therein.

The lower molding assembly 14 comprises a bed or base forming member 18 (FIG. 2) covered with a heat insulating pad or sheet of asbestos, or the like, as indicated at 20 on which there is positioned an aluminum block or plate member 22 (FIGS. 2 to 5) having mounted in suitable recesses therein three heating elements 24, each having provision for connection to an electrical supply line. The block 22 also has a conduit 26 built into the same with connections, indicated at 28, for attaching a fluid line so as to circulate water or other liquid. The block 22 is adapted to support on its upper face a relatively thin, stainless steel plate 30 on the top of which a pyrex glass plate 32 is adapted to be positioned, the latter forming the bottom or floor of a molding cavity 34 which is defined by a rectangular steel frame 36 having a chrome plated surface. The molding frame 36 constitutes a female molding die with a cavity 34 dimensioned according to the size desired for the plate which is to be formed. The die frame 36 is adapted to be held in position on the frame 22 by means of a pair of oppositely disposed clamps 38. Each of the clamps 38 consists of a base plate 40 which has a depending bracket 42 bolted or otherwise secured to the frame 22. There is a top clamping plate 44 pivoted on a spacer 45 above the plate 40 and connected to the bottom plate 40 by one or more bolts 46, with a compression spring 48 carried thereon and holding the top plate 44 elevated so that the frame 36 and glass 32 can be slid into position from the side of the assembly which is free of the clamps. The die frame 36 is provided in its vertically positioned walls with a liquid receiving conduit 50 having suitable means, as indicated at 51, for connecting to a fluid supply to permit circulation of liquid therein. The liquid conduit 50 may be conveniently formed by boring the side walls and plugging the ends of the bores, except for connections 51, where required to form a continuous conduit as shown in FIG. 4. Electric heating elements are also disposed in suitable recesses in the frame walls as indicated at 52. At a predetermined level there is a groove extending about the perimeter of the cavity, as indicated at 53, which is provided with a series of outlets and a connection, as at 54, with a vacuum line, so that the cavity 34 may be evacuated after it is closed by descent of the telescoping punch-like upper die member 56 which depends from the top mold assembly 16.

Figure 5:
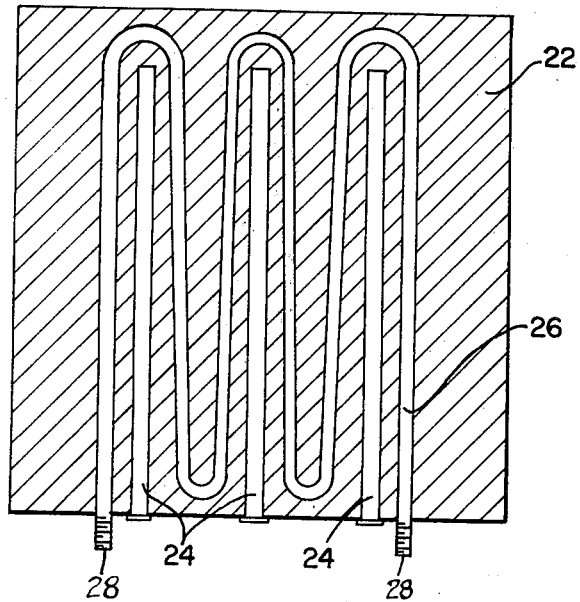
FIG. 5 is a horizontal cross section taken on the line 5—5 of FIG. 2.

The upper molding assembly 16 comprises the punch-like die member 56 which depends from an aluminum block 58 forming a base therefor. The block 58 corresponds to the block 22 in the bottom mold assembly 14 and is provided with heating elements and a fluid circulating conduit in the same manner as the block 22 and as shown in FIG. 5. The block 58 is provided with a pair of oppositely disposed, angular clamp members 60, each with a clamping bolt 62, so as to provide for detachable support of the punch 56 and block 58 on a steel support plate or block 64. The block 58 carries three heating elements indicated at 66 with suitable attachments for connection with an electrical supply line and also has a fluid conduit, indicated at 67 with connections for a water line in the same manner as block member 22. The block 64 is bolted or otherwise attached to the bottom plate 68 which is mounted on the end of the piston 70, the latter depending from an air cylinder 72 which is suitably supported on a stand or other mounting frame (not shown). The support block 64 has heaters 73 mounted in suitable recesses with connections for attachment to a suitable current supply line. An asbestos insulating pad 74 may be interposed between the base block 64 and piston head 68. The die member 56 is provided with heating elements 76 and a fluid conduit 78 which may be arranged in the same manner as in FIG. 5 but in vertically offset planes as indicated in FIG. 2. The punch-like die member 56 and its associated base block 58 and clamp member 60 form a detachable unit so that the apparatus may be adapted for forming plates of different dimensions by substitution of the right size punch and die members.

While the lower die frame 36 is shown with a single cavity 34, multiple cavities may be provided by inserting suitable dividers of the proper height.

In using the apparatus, the proper size punch and die members are selected and positioned in the press after which the upper assembly 16 is lowered a sufficient distance to permit the bottom die frame 36 to be properly aligned for telescoping movement of the punch member 56 into the cavity 34, the spring clamps 38 permitting limited lateral adjustment of the frame 36. The punch member 56 is then lowered a predetermined distance into the cavity 34, after the mold surfaces have been sprayed or otherwise treated with silicone or other lubricant to facilitate release of the product when it is completed. In a typical forming operation, the mold cavity 34 is initially preheated, after the mold surfaces including the pyrex plate 32, have been sprayed with a release agent or lubricant. The pyrex glass plate 32 is cleaned and slid into place first with the female mold frame 36 positioned on the top thereof and centered relative to the punch 56 for clamping into position. The heating elements are then activated to preheat the cavity 34 to approximately 150° F., the heating being controlled by suitable thermostatic controls (not shown). The mold cavity 34 is then opened by withdrawing the punch 56 and a layer of granular or powdered resin material, for example, polymethylmethacrylate, is spread evenly over the bottom portion of the cavity 34. The specimen 12 is then placed on the top of the layer of resin material, the latter supporting the specimen 12 in the position desired. Another layer of the resin material is then spread over the specimen making sure that the vacuum ports in the recess or groove 53 are not obstructed. The punch member 56 is then lowered to a position where it is supported on a pair of heat resistant shocks 80 (FIG. 3) of rubber or like material, which are in the form of rectangular blocks. The shocks 80 are positioned on the peripheral margins of the frame 36 which are free of the clamps 38 so as to limit the entry of the punch member 56 into the mold cavity 34. This prevents crushing of the specimen by the weight of the punch member 56 bearing on the resin. The heating elements are then activated to build up the heat to approximately 210° F. which liquifies the resin and the rubber shocks 80 are removed, allowing the punch 56 to float and descend by gravity while the temperature is raised to approximately 275° F. to allow for final polymerization of the resin. At this temperature, the heat is shut off and vacuum is applied in order to allow time for complete melting of the plastic material and permitting final vacuum eradication of excess heat and gases. The temperature is allowed to drop down to approximately 250° F. when the mold and punch cooling systems are activated to cool down the cavity and the melted resin with the vacuum still on and the punch 56 sliding down by gravity only. A relatively low pressure between 0.1 and 1.5 pounds per square inch is applied through the cylinder 72 to the punch 56 and held until the resin is set so as to maintain a standard level and halt any resurgence of heat from top and bottom elements which might otherwise result in ballooning or swelling of the surfaces. The cooling system is activated to circulate water to cool the mold and cavity 34 at approximately 200° F. switching from hot to cold water, with the water being recirculated throughout the system. At approximately 100° F., the cooling system is disconnected and pressure released on the punch 56 so that the latter may be withdrawn from the mold cavity 34 after which the frame 36 may be slid out from beneath the clamps 38 to release the finished product, the vacuum having been disconnected.

While specific temperatures are referred to in the example described, it will be understood that the exact temperature or range of temperature in each instance will depend upon the specific product which is employed as the resin material.

I claim:

1. A method of embedding specimens in a thermoplastic resin material which comprises providing a female mold member having a cavity of a size required for producing a plate-like finished product of predetermined size and a male mold member with a punch formation adapted to telescope into the cavity in said female mold member, engaging the mold members sufficiently to close the cavity and preheating the cavity, disengaging the mold members and placing in the cavity a predetermined amount of a granular resin which is adapted to be polymerized from the molten state by application of heat and pressure to form a transparent plate, embedding the desired specimen in said granular resin, engaging the mold members to close the cavity and confine the resin and specimen in the cavity without appreciable pressure on the material, heating the material in the cavity to melt the resin, applying pressure to said molten resin while raising the temperature to polymerize the resin without damage to the specimen, applying vacuum to the cavity to remove excess gases during polymerization, and cooling the material while under pressure so as to harden the resin.

2. A method of embedding specimens in a thermoplastic resin material as set forth in claim 1 and applying relatively light pressure to the material in the cavity while raising the temperature to the degree required for polymerization by allowing the male mold member to float on the top of the melted resin and thereafter applying greater pressure to the material through downward pressure applied to the male mold member.

3. A method of embedding specimens in a thermoplastic resin material as set forth in claim 1 and applying vacuum to the cavity at the maximum temperature for polymerization and also during the polymerization and cooling of the material.

4. A method of embedding specimens in a thermoplastic resin material which comprises providing a female mold member having a molding cavity of a size required for producing a plate-like finished product of predetermined size and a male mold member with a punch formation adapted to telescope into the cavity in said female mold member, engaging the mold members sufficiently to close the cavity and heating the mold members to preheat the cavity, disengaging the mold members and placing in the cavity layers of a granular resin which is adapted to be polymerized by application of heat and pressure to form a transparent plate, positioning the desired specimen between said layers of resin, engaging the mold members to close the cavity and confine the resin and specimen without applying pressure to the material, heating said mold members to a temperature sufficient to melt the resin, applying pressure to the material while increasing the temperature thereof to polymerize the resin, applying vacuum to the cavity to remove excess gases while the resin is polymerizing, and cooling the mold members while holding the material in the cavity under pressure to harden the resin.

5. A method of embedding specimens in thermoplastic resin material as recited in claim 4 wherein the mold members are provided with fluid receiving conduits and the heating and cooling of the mold members is accomplished at least in part by circulating fluid of the desired temperature through said conduits.

6. A method of embedding specimens in the thermoplastic material as recited in claim 4 wherein said male mold member is carried on the piston of a fluid operated cylinder and said male mold member is first telescoped into the female mold member a limited distance to close the molding cavity without applying appreciable pressure to the resin material in the cavity after which said male mold member is allowed to float by gravity on the resin as the latter is melted and applying pressure on the melted resin through operation of the cylinder for polymerization of the resin.

7. A method of embedding specimens in a thermoplastic material as recited in claim 1 wherein an acrylic resin is employed and the material in the cavity is heated to approximately 210° F. to melt the resin without the application of any pressure, pressure is then applied to the material by allowing the male mold member to float on the top of the resin while the temperature is raised to approximately 275° F. and vacuum is applied to the cavity, after which the temperature is allowed to drop to approximately 250° F. when the pressure on the material is increased through the male mold member to hold the material at a predetermined level in the cavity and the material is cooled to a hardened state.

* * * * *